United States Patent [19]
Avery

[11] 4,087,961
[45] May 9, 1978

[54] FUEL CONTROL SYSTEM FOR GAS TURBINE ENGINE OPERATED ON GASEOUS FUEL

[75] Inventor: Paul A. Avery, Fort Collins, Colo.

[73] Assignee: Woodward Governor Company, Rockford, Ill.

[21] Appl. No.: 707,188

[22] Filed: Jul. 21, 1976

[51] Int. Cl.² .............................................. F02C 9/08
[52] U.S. Cl. .......................... 60/39.28 R; 60/39.46 G
[58] Field of Search ................... 60/39.28 R, 39.28 T, 60/39.16 R, 39.14, 223, 39.46 G, 39.46 P; 415/10, 15, 17

[56] References Cited

U.S. PATENT DOCUMENTS

| | | | |
|---|---|---|---|
| 3,279,169 | 10/1966 | Bayard | 60/39.28 R |
| 3,413,806 | 12/1968 | Belke | 60/39.28 R |
| 3,488,948 | 1/1970 | Cornett | 60/39.28 R |
| 3,688,495 | 9/1972 | Fehler | 60/39.28 R |
| 3,759,037 | 9/1973 | Kiscaden | 60/223 |
| 3,832,846 | 9/1974 | Leeson | 60/39.28 R |

Primary Examiner—Clarence R. Gordon
Attorney, Agent, or Firm—Leydig, Voit, Osann, Mayer & Holt, Ltd.

[57] ABSTRACT

A gas turbine engine is operated from a gaseous fuel supply whose pressure may occasionally drop from a normal and comparatively high value. The acceleration limit schedule for the engine is established as a function of compressor discharge pressure but this schedule is modified as a function of fuel supply pressure so that, when lower than normal supply pressures exist, the engine may develop substantially the maximum power which is possible at the lower supply pressures.

6 Claims, 6 Drawing Figures

Fig. 2a.

FUEL CONTROL SYSTEM FOR GAS TURBINE ENGINE OPERATED ON GASEOUS FUEL

BACKGROUND OF THE INVENTION

This invention relates to a control system for regulating the rate of fuel flow to the burners of a gas turbine engine having a rotary compressor whose discharge pressure is detected and is used in establishing the flow rate at various times such as when the engine is accelerating. More particularly, the invention relates to a system for controlling a turbine engine adapted to burn gaseous fuel such as natural gas supplied from a conventional source and normally maintained at a predetermined and comparatively high pressure such as by a boost compressor and a constant pressure regulator.

The rate of fuel flow to the engine is controlled by a fuel metering valve which is adapted to be opened and closed to increase and decrease the fuel flow. Opening and closing of the value is effected in response to a signal, usually a function of speed error, produced by a governor which regulates the fuel flow so as to keep the engine running properly under different operating conditions.

When the engine is to be accelerated, the governor may attempt to open the metering valve to its full open position and allow maximum flow of fuel to the engine. If the engine receives too much fuel for a given set of operating conditions, surge and/or dangerously high temperatures can result. To protect the engine during acceleration, an acceleration limit control detects an engine operating parameter (e.g., compressor discharge pressure) and prevents the metering valve from opening beyond a given limit position even though the governor may be calling for more fuel. The limit position of the valve varies as a function of compressor discharge pressure, and the valve is permitted to open to a wider limit position as compressor discharge pressure increases and the engine is capable of safely tolerating more fuel. Thus, the limit position of the valve is scheduled with respect to compressor discharge pressure, the schedule commonly being referred to as an acceleration limit schedule.

When the engine is operating on gaseous fuel, it is possible for the gas supply pressure to drop from its normal high value. This occurs, for example, if the boost compressor should malfunction or if the supply gas main pressure should drop inordinately. When the gas supply pressure to the metering valve falls, the rate of fuel flow to the engine is reduced when compared with the flow rate that prevails with the valve in the same position but with the gas supply pressure at its normal high value. When the normal acceleration limit schedule for normal supply pressure is maintained at lower supply pressures, the metering valve is prevented from opening sufficiently far to deliver enough fuel to enable the engine to accelerate at the maximum safe rate, or to develop optimum steady state power, at the lower supply pressure.

SUMMARY OF THE INVENTION

The general aim of the present invention is to provide a new and improved fuel control system in which the normal acceleration limit schedule is automatically modified in response to decreases in fuel supply pressure so that the engine may receive sufficient fuel to develop, at lower than normal supply pressures, substantially the maximum power which is possible with the lower supply pressures.

A more detailed object is to detect the fuel supply pressure and to modify the normal acceleration limit schedule as a generally inverse function of the supply pressure. In this way, different acceleration limit schedules are established for different supply pressures so as to permit the metering valve to open to progressively wider limit positions as the supply pressure assumes progressively lower values.

The invention also resides in the novel manner of establishing different acceleration limit schedules for different supply pressures by producing signals representative of compressor discharge pressure and fuel supply pressure and modifying the compressor discharge pressure signal by multiplying the latter signal by a factor which increases as the fuel supply pressure signal decreases, the modified compressor discharge pressure signal being used to establish the acceleration limit schedule for a given supply pressure.

These and other objects and advantages of the invention will become more apparent from the following detailed description when taken in conjunction with the accompanying drawings.

BRIEF DESCRIPTION OF THE DRAWINGS

FIG. 5 shows sets of curves which demonstrate the effect on rate of fuel flow when the normal acceleration limit schedule is modified and is not modified as a function of fuel supply pressure.

DETAILED DESCRIPTION OF THE PREFERRED EMBODIMENT

Figure 1:
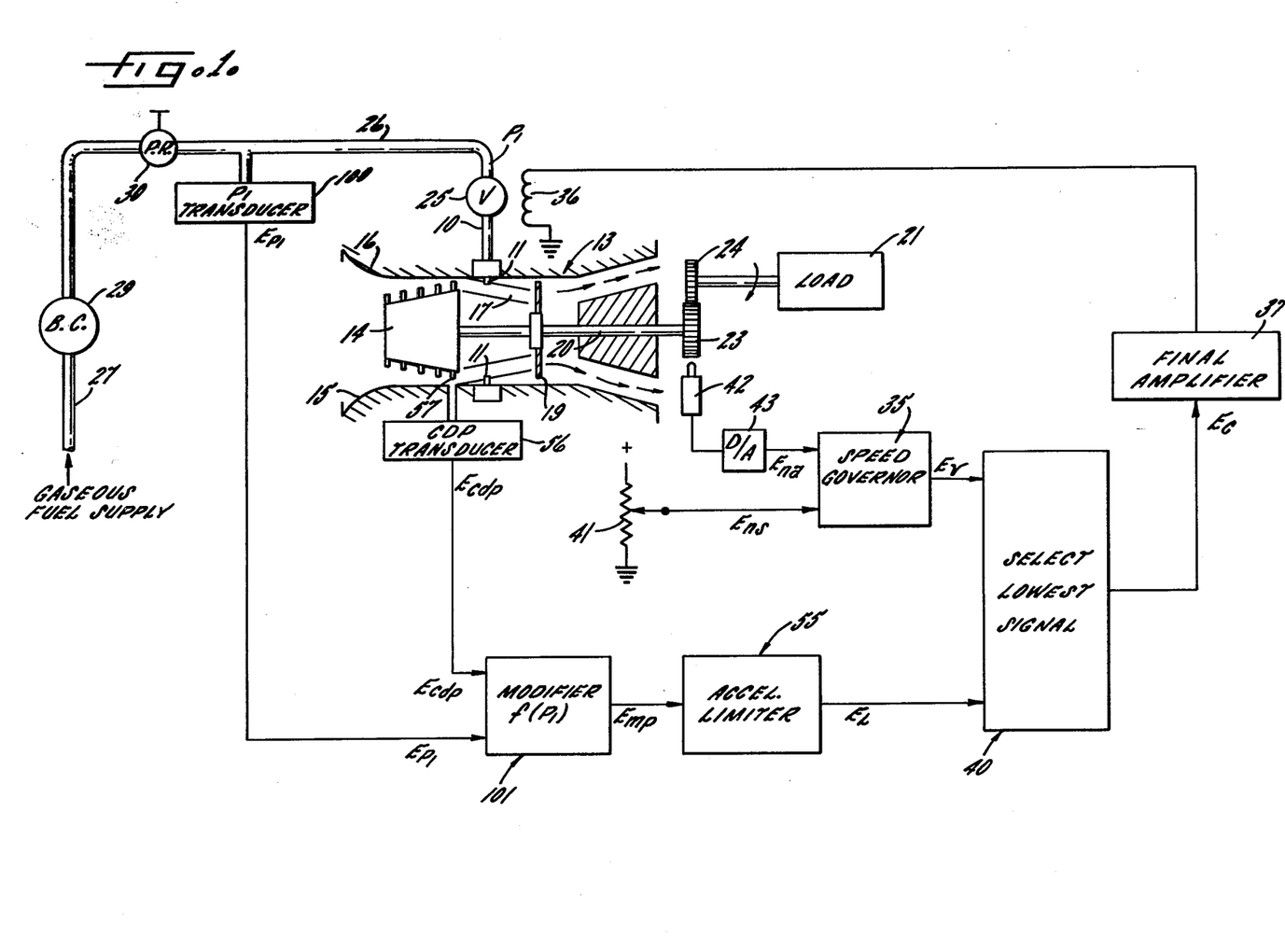
FIG. 1 is a schematic illustration of a typical gas turbine engine equipped with a new and improved fuel control system embodying the novel features of the present invention, the control system being shown in block diagram form.

In the drawings, the improved fuel control system of the present invention is shown as especially adapted for use in regulating the flow rate of gaseous fuel to a line 10 leading to the burner nozzles 11 of a stationary gas turbine engine 13 having the usual rotary compressor 14. Air entering the inlet 15 of an elongated housing 16 passes successively through the rotor of the compressor 14, a combustion chamber 17, and the blades of a turbine 19 before being discharged from the outlet of the housing. A shaft 20 is connected to the turbine 19 and drives not only the compressor 14 but also a load 21 such as an electrical alternator, the shaft being coupled to the load by a suitable transmission shown as gears 23 and 24.

A fuel metering valve 25 communicates with the line 10 and receives fuel through a line 26 from a suitable source of gaseous fuel such as a supply line 27 of methane. Located in the line 26 between the supply line 27 and the valve 25 are a boost compressor 29 and a constant pressure regulator 30. The boost compressor increases the pressure of the gas delivered from the supply line 27 while the regulator causes the gas to be supplied to the inlet of the valve 25 at a constant and comparatively high pressure such as 210 psia. The supply or inlet pressure to the valve conventionally is represented by the symbol $P_1$ while the normally prevailing $P_1$ pressure of 210 psia. may be conveniently represented by the symbol $P_n$.

Opening and closing of the valve 25 is controlled by means such as a speed governor 35 which compares the actual speed of the engine 13 with a commanded or set point speed. If the actual speed differs from the set point speed, the governor causes the valve to open or close as necessary to bring the actual speed into agreement with the set point speed.

The metering valve 25 may take any of a variety of well known specific organizations. For purposes of illustration and discussion, that valve 25 is mechanically biased (by means not shown) toward a closed position and is actuated by the excitation of an associated electromagnetic coil 36. It may be assumed that the valve 25 moves from a fully closed to a fully open position as the voltage applied thereto from a final amplifier 37 varies from 0 to 100 volts. The governor 35 normally creates a valve command signal $E_v$ (FIG. 1) which is transmitted through a "select lowest signal" circuit 40 to form a control signal $E_c$ at the input of the final amplifier 37. Again, merely for purposes of discussion, it may be assumed that as the voltages $E_v$ and $E_c$ vary from 0 to 10 volts, the output from the amplifier 37 (applied to the coil 36) varies from 0 to 100 volts and the valve 25 moves from an almost fully closed (idle) to a fully open position.

The governor 35 may be of a well known electronic type and thus the specifics of its construction and operation need not be described in detail. It will suffice to say that the set point speed may be established by setting an adjustable potentiometer 41 which produces a voltage $E_{ns}$ representative of the desired or set point speed of operation of the engine 13. The actual speed of the engine is detected by a magnetic probe 42 positioned adjacent the gear 23 and operable to produce a train of pulses as the teeth of the gear rotate past the probe, the frequency of the pulses being proportional to the speed of the engine. The pulses are routed to a digital-to-analog converter 43 which produces a dc. voltage $E_{na}$ whose magnitude varies in proportion to input frequency and thus to the actual speed of the engine.

Figure 2A:
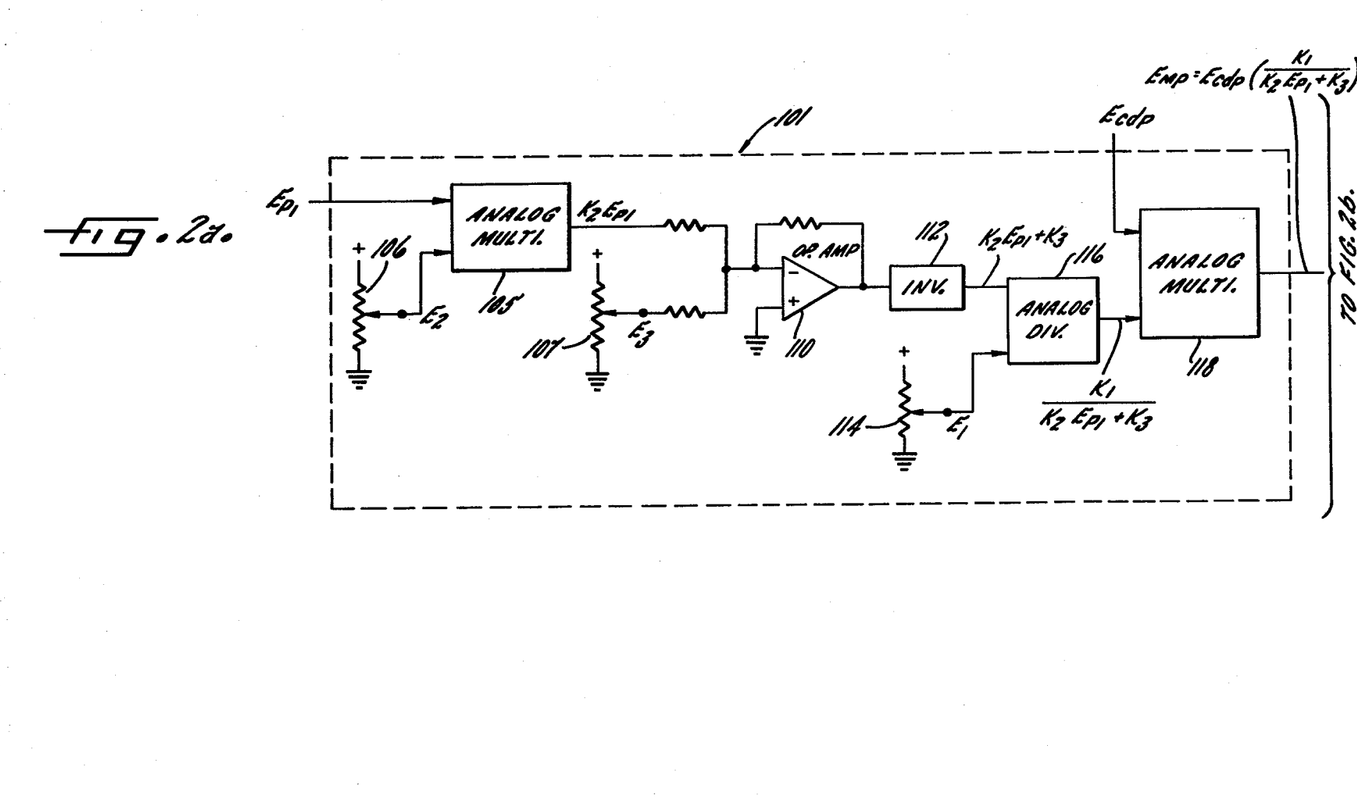
FIGS. 2a and 2b, when joined where indicated, form a more detailed electrical schematic diagram of the control system shown in FIG. 1.
Figure 2B:
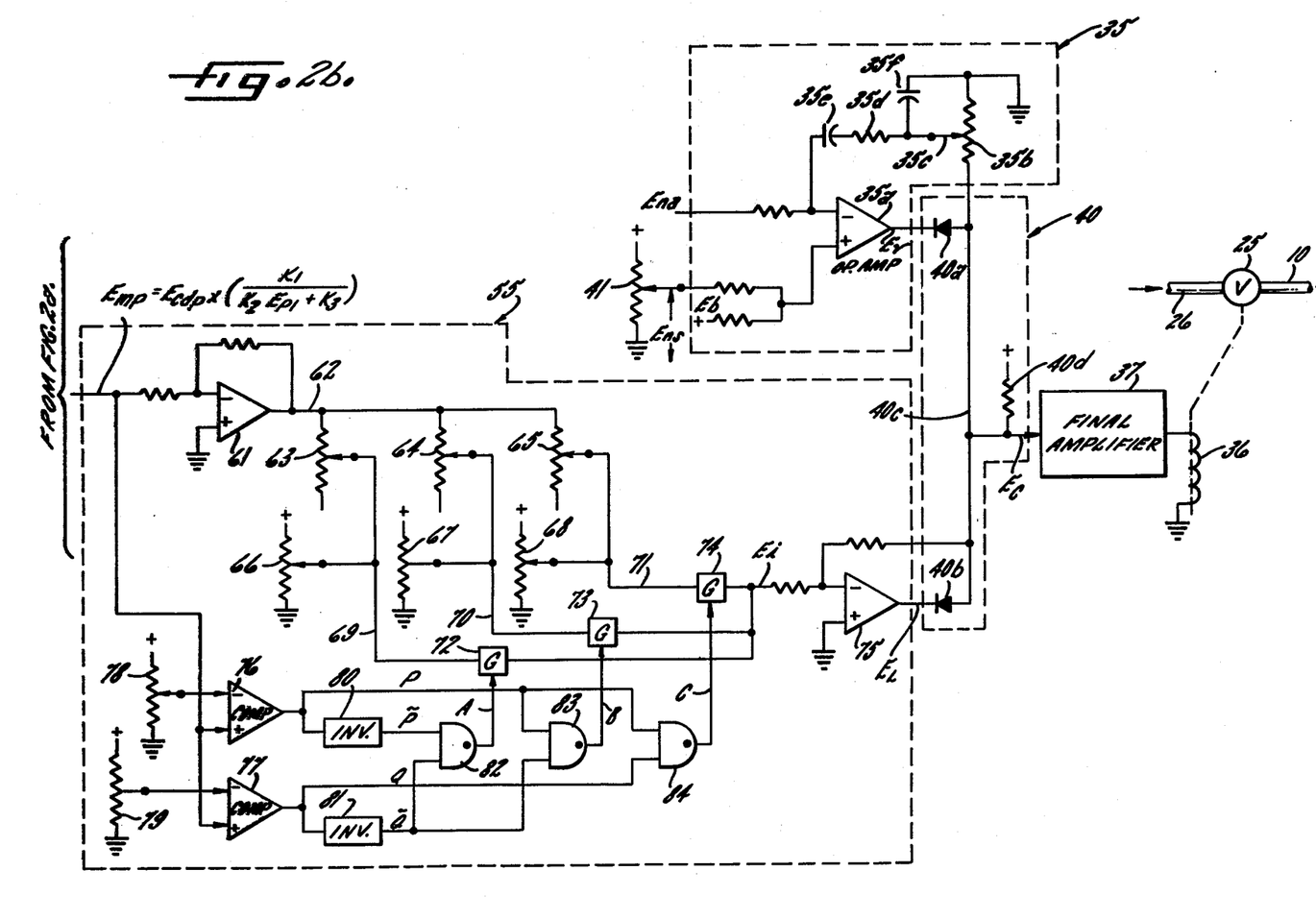

In somewhat more detail, the governor circuit 35 as shown in FIG. 2b may be formed by an operational amplifier 35a having high open loop gain and connected to serve as an algebraic summing device with a proportional integral-derivative (PID) transfer function. The actual speed signal $E_{na}$ is applied to the inverting input terminal through an input resistor, while the set point voltage $E_{ns}$ and a bias voltage $E_b$ are applied through resistors to the non-inverting input terminal. Negative feedback is created by coupling the output side of a diode 40a (to be described later) to a potentiometer 35b. The opposite end of the potentiometer is grounded and the adjustable wiper 35c thereof is returned via a resistor 35d and a capacitor 35e to the amplifier inverting input terminal. The active portion of the potentiometer 35b between ground and the wiper 35c is paralleled with a capacitor 35f.

This governor circuit operates with PID action in a fashion which is per se well known in the art. The effective net input signal is $E_b + (E_{ns} - E_{na})$, where $(E_{ns} - E_{na})$ represents the speed error at any instant. The output voltage $E_v$ may stabilize at any value between the limits of 0 and +10 volts because of the integrating action introduced by the capacitor 35e in the feedback path, but it will normally reside at approximately the value of +5 volts when the set point and actual speed signals $E_{ns}$ and $E_{na}$ are equal and cancel one another. More particularly, the differentiating action of the capacitor 35e in the feedback path introduces an integrating characteristic into the overall transfer function of the operational amplifier 35a. The value chosen for that capacitor determines the relative strength or effect of the integral term in the transfer function. Similarly, the series resistor 35d in the feedback path determines the magnitude of a proportional term in the overall transfer function. The capacitor 35f, which acts as an integrator in the feedback path when the signal between the wiper 35c and ground changes, introduces a derivative term in the overall transfer function. And finally, the setting of the potentiometer wiper 35c establishes the overall gain for the transfer function of the operational amplifier 35a.

As the actual speed voltage $E_{na}$ tends to increase or decrease due to lessening or increasing of the torque imposed on the engine 13 by the load 21 (or as the set point voltage $E_{ns}$ is decreased or increased by adjustment of the wiper of potentiometer 41), the output voltage $E_v$ will tend to decrease or increase so as to close or open the valve 25 and thereby decrease or increase the rate at which fuel is delivered to the engine. After each such transient change, the strong integrating characteristic of the amplifier 35a results in the output voltage $E_v$ residing at some steady state value necessary to hold the valve 25 with a proper degree of opening to maintain the speed error $(E_{ns} - E_{na})$ with a small and almost negligible value. While the governor system is not isochronous, it operates with a very small amount of speed versus load regulation as the torque imposed by the load 21 increases. Yet, during transient conditions, the proportional and derivative characteristics of the transfer function may drive the valve 25 to essentially a full open position in order to eliminate any speed error with a very short transient response time. Thus, it may be understood for purposes of discussion that the command voltage $E_v$ can vary between lower and upper limits of 0 to 10 volts in order to call for the valve 25 to shift from a fully closed (idle) to a fully open position. Under normal circumstances, the voltage $E_v$ is transmitted through the selector circuit 40 to form the control voltage $E_c$. Therefore, when the load 21 suddenly increases (thereby making the actual engine speed tend to fall), or when the set point signal $E_{ns}$ is suddenly increased, the valve 25 will tend to move substantially to its fully open position creating maximum fuel input rate. Thereafter, as the actual speed varies slightly from the set point speed, the signal $E_v$ will correctively change to reposition the valve 25 so as to maintain actual speed at the set point value with very slight, essentially negligible, speed regulation.

To restrict the allowable maximum fuel flow, and thereby prevent compressor surge and/or excessive turbine blade temperatures, there is provided an acceleration limiter 55 (FIGS. 1 and 2b) which herein schedules maximum fuel flow as a function of compressor discharge pressure (CDP). The acceleration limit schedule may be established on the basis of engine parameters other than CDP, such as speed taken with engine inlet air temperature, or exhaust gas temperature. Where, as in the present example, the acceleration limit schedule is based on CDP, the control system includes means in the form of a pressure-to-voltage transducer 56 which senses or detects the pressure in the compressor discharge section 57 of the engine 13 and produces a voltage signal $E_{cdp}$ having a magnitude proportional to the actually existing compressor discharge pressure. In accordance with the practice of the present invention in one specific embodiment, the signal $E_{cdp}$ is used to produce a modified voltage signal $E_{mp}$ which constitutes the input to the acceleration limiter 55. In general, the acceleration limiter 55 responds to the input signal $E_{mp}$ and produces a voltage signal $E_L$ which varies as a function of CDP, and which is employed to limit the displacement of the metering valve 25 beyond a "scheduled maximum" open position even though the error signal $E_v$ from the governor 35 may be calling for the valve to assume a more widely open position.

Figure 3:
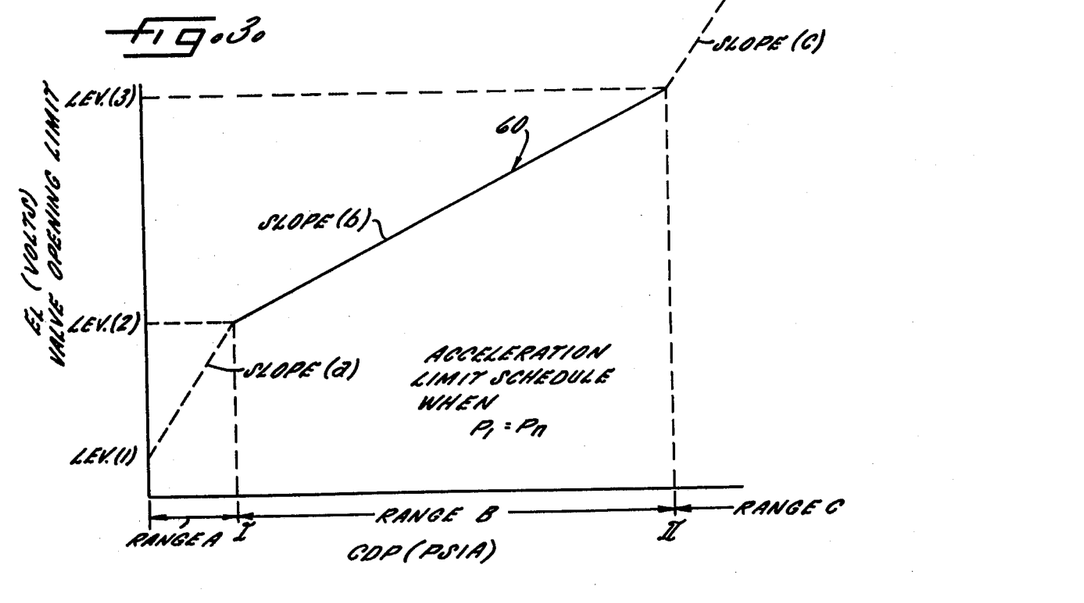
FIG. 3 is a graph showing a typical acceleration schedule which exists when the fuel supply pressure is at its normal value.

The curve 60 shown in FIG. 3 illustrates how the value of the limit signal $E_L$ typically varies with respect to changes in CDP when the inlet pressure $P_1$ to the valve 25 is at its normal value $P_n$ established by the boost compressor 29 and the pressure regulator 30. As shown in FIG. 3, the value of $E_L$ changes from the level (1) to level (2) at a predetermined arbitrary slope ($a$) as CDP changes through range A. When CDP varies through range B, the value of $E_L$ changes more gradually from level (2) to level (3) as indicated by that portion of the curve 60 labeled slope ($b$). Finally, the signal $E_L$ changes above level (3) as still a third function of CDP as the latter changes through range C, the third function being indicated by that portion of the curve labeled as slope ($c$). Of course, other arbitrary limit schedules relating $E_L$ to CDP may be chosen, as is well known in the art, according to the temperature limitations and surge region characteristics of the particular engine being controlled.

The three-slope curve 60 shown in FIG. 3 represents the acceleration limit schedule which prevails when the inlet supply pressure $P_1$ is equal to the normal value $P_n$. Thus, the schedule 60 may be referred to as the normal limit schedule. This schedule is predetermined in accordance with the operating characteristics of a particular engine 13.

Asssuming for the moment that the modified signal $E_{mp}$ supplied as the input to the limiter 55 is the same as the compressor discharge pressure signal $E_{cdp}$, the operation of the acceleration limiter may be better understood from the exemplary form illustrated in some detail by FIG. 2$b$. The input signal $E_{mp}$ (assumed for the moment to be the same as $E_{cdp}$) is applied via an input resistor to the inverting input terminal of an operational amplifier 61 having a negative feedback resistor and having its non-inverting input grounded so that it functions as an inverter. As CDP increases and the signal $E_{mp}$ rises, therefore, the signal on output line 62 increases in a negative sense. This signal is coupled through three rheostats 63, 64 and 65 to the wipers of three potentiometers 66, 67 and 68 to create three output voltages on the respective conductors 69, 70 and 71 forming inputs to respective ones of gates 72, 73 and 74.

Adjustment of the rheostats 63, 64 and 65 respectively establishes or selects the slope of the negative signal appearing at the inputs of the gates 72, 73 and 74 as CDP and the input signal $E_{mp}$ increase. On the other hand, adjustment of the potentiometers 66, 67 and 68 establishes the level from which the inputs to the gates 72, 73 and 74 increases in a negative direction as CDP increases and the voltage on line 62 becomes progressively more negative. Thus, one may see that the input to gate 72 on conductor 69 varies in an inverted sense with slope (a) established by rheostat 63 as CDP increases. Similarly, the input to gate 73 on conductor 70 varies in an inverted sense with a slope ($b$) determined by rheostat 64, as CDP increases. Similarly, except for variation in a negative sense, the signal at the input of gate 74 varies with a slope ($c$) established by the rheostat 65.

The three gates 72, 73 and 74 are selectively enabled so that the signals on lines 69, 70 or 71 are respectively transmitted to the input of an inverting amplifier 75 when the input signal $E_{mp}$ (assumed to represent CDP) falls in the magnitude ranges corresponding to range A, range B and range C as shown in FIG. 3. For this purpose, the input signal $E_{mp}$ to the limiter 55 is fed to the non-inverting inputs of two high gain operational amplifiers connected without feedback so that they function as voltage comparators 76 and 77. The inverting inputs of these comparators 76 and 77 receive voltages from the wipers of respective potentiometers 78 and 79. As is well known, and the comparing operational amplifiers 76 and 77 saturate to produce their maximum positive output signal (say +10 volts) when the non-inverting input voltages are greater than the inverting input voltages. Conversely, they produce their maximum negative or minimum output voltage (say 0 volts) when the inverting inputs are greater than the non-inverting input voltages. By adjustment of the potentiometers 78 and 79, the comparison levels for the comparators 76 and 77 are established in a fashion to create the boundaries of range A, range B and range C shown in FIG. 3.

It may be assumed that the maximum positive output voltage from comparator 76 or 77 represents a binary logic 1 level signal, whereas the minimum or maximum negative output of those comparators represents a binary 0 logic level signal. If potentiometer 78 is adjusted to produce a voltage equal to $E_{mp}$ when CDP has a value labeled I in FIG. 3, and potentiometer 79 is adjusted to provide a voltage corresponding to a CDP value labeled II in FIG. 3, then the outputs P and Q from the comparators 76 and 77 will take on different binary values as the input signal $E_{mp}$ lies in three different ranges. These signals are passed through inverters 80 and 81 to create the binary level signals $\overline{P}$ and $\overline{Q}$; and the four binary signals are applied in different pairs, as shown, to AND gates 82, 83 and 84. The outputs of the latter gates, here labeled A, B, C in FIG. 2 are the controlling inputs to the signal transmission gates 72, 73 and 74. The operation of selecting a different one of the three slope signals within different ranges of the input signal $E_{mp}$ may be seen from the following table:

| $E_{mp}$ INPUT SIGNAL | P | Q | $\overline{P}$ | $\overline{Q}$ | $A = \overline{P} \cdot \overline{Q}$ | $B = P \cdot \overline{Q}$ | $C = P \cdot Q$ | INPUT TO 75 |
|---|---|---|---|---|---|---|---|---|
| 0<CDP<I | 0 | 0 | 1 | 1 | 1 | 0 | 0 | Line 69 |
| I<CDP<II | 1 | 0 | 0 | 1 | 0 | 1 | 0 | Line 70 |
| II<CDP | 1 | 1 | 0 | 0 | 0 | 0 | 1 | Line 71 |

As $E_{mp}$ progressively increases through ranges A, B and C, the input $E_i$ to the inverting operational amplifier 75 becomes progressively more negative. It first follows a slope selected by rheostat 63 and which begins from a level selected by potentiometer 66 while gate 72 is enabled due to the presence of a signal at A. When $E_{mp}$ exceeds threshold I but is less than threshold II, the signal $E_i$ follows a slope selected by rheostat 64 and which begins from a level selected by potentiometer 67 while gate 73 is enabled by a signal at B. And finally, when $E_{mp}$ exceeds threshold II, the signal $E_i$ follows a slope selected by rheostat 65 and from a level selected by potentiometer 68 while gate 74 is enabled by a signal at C. The reference potentiometers 78 and 79 are adjusted to produce switching from gate 72 to gate 73 to gate 74 at the intersections of those three slopes.

The operational amplifier 75 with negative feedback is an inverting amplifier and its output signal $E_L$ thus increases positively as the input $E_i$ increases negatively. Therefore, the output signal $E_L$ varies with CDP as represented by the graph 60 in FIG. 3, —assuming, as stated above — that the limiter input signal $E_{mp}$ represents the sensed value of CDP in the engine 13.

To control the position of the metering valve 25 according to the lesser one of the voltage signals $E_v$ or $E_L$, and thereby limit the valve opening and fuel rate so that it cannot exceed the scheduled limit at any value of CDP, the "select lowest signal" circuit 40 serves automatically to switch the smallest of the voltages $E_v$ or $E_L$ to the input of the final amplifier 37. As shown in FIG. 2b, the circuit 40 is formed by two diodes 40a and 40b with their cathodes connected respectively to the outputs of amplifiers 35a and 75, and with their anodes connected to a common bus 40c leading to the lower end of a resistor 40d having its upper end connected to a regulated positive voltage source (say +10 volts). The input of the final amplifier 37 (receiving the control voltage $E_c$) is taken from the junction of the resistor 40d and the common bus 40c.

The diodes 40a and 40b may be viewed ideally for purposes of discussion as switches which are open when reversely biased and closed when forwardly biased. Thus, if $E_v$ is less than $E_L$, the diode 40a is conductive to draw current through resistor 40d, and the resulting voltage drop across that resistor (and with theoretically zero voltage drop across diode 40a), the bus 40c and the voltage $E_c$ resides at the value of $E_v$. This reverse voltage biases the diode 40b so that it is non-conductive, and the limit schedule voltage $E_L$ has no effect on the final amplifier 37 or the valve 25. On the other hand, if the voltage $E_L$ is less than $E_v$, the diode 40b draws current through resistor 40d so that the voltage $E_c$ takes on a value of the voltage $E_L$, the diode 40a is reverse biased, and the voltage $E_v$ has no effect on the valve 25. It will be understood, therefore, that the "select lowest signal" circuit 40 transmits to the final amplifier 37 the lesser one of the voltages $E_v$ and $E_L$.

Under ordinary circumstances, the valve command voltage $E_v$ from the governor circuit 35 determines the position of the valve 25 and the rate of fuel flow to the engine 13. But if at any time the valve command voltage $E_v$ from the govenor circuit tends to exceed the limit established by the voltage $E_L$ (which is a function of the signal $E_{mp}$ and sensed CDP), then the voltage $E_L$ becomes the input $E_c$ to the amplifier 50, and the valve 25 can open no wider than a position which corresponds to the limit voltage $E_L$. Of course, as the CDP builds up, the limit signal $E_L$ increases in magnitude and enables the valve to be opened wider so as to admit more fuel to the engine until finally sufficient fuel is made available to place the governor in control and to reduce the speed error essentially to zero so that the engine operates on a steady state basis.

It is possible for the boost compressor 29 in the gas supply line 27 to malfunction or fail. If this occurs, the pressure regulator 30 is not capable of maintaining the inlet gas pressure $P_1$ at its normal, assumed value $P_n$ of approximately 210 psia. but instead the pressure $P_1$ will fall to or approximately to the value of the prevailing pressure in the supply line 27 and may be reduced to 100 psia. or lower. When the value of $P_1$ falls below $P_n$, the flow rate of fuel through the valve 25 — with the latter in a given position — is less than when the valve is in the same position and the inlet pressure $P_1$ is at its normal value $P_n$. As a result, fuel is delivered at a lesser rate to the engine 13 when the valve is in any particular position and the inlet pressure $P_1$ drops from its normal value $P_n$.

In accordance with the present invention, the magnitude of the inlet gas pressure $P_1$ is detected and the normal acceleration limit schedule 60 is automatically modified whenever the inlet pressure falls below its normal value $P_n$. Indeed, different acceleration limit schedules are established whenever the inlet pressure $P_1$ assumes different values below $P_n$. As a result, the metering valve 25 may shift to more widely open limit positions when the pressure $P_1$ is below normal and thus the flow rate of fuel to the engine 13 may more nearly approximate that which prevails at normal inlet pressures, so that the engine may develop more power (and accelerate more rapidly) than would be the case if the valve were restricted to opening according to the normal schedule 60.

More specifically, the inlet pressure $P_1$ is detected by a pressure-to-voltage transducer 100 similar to the transducer 56 and operable to sense the pressure in the line 26 between the valve 25 and the regulator 30. The transducer 100 produces a voltage signal $E_{p1}$ whose magnitude is proportional to the prevailing value of the fuel inlet pressure $P_1$. Both the signal $E_{p1}$ and the signal $E_{cdp}$ are applied to a modifier 101 which creates the signal $E_{mp}$ (i.e., the input signal to the acceleration limiter 55) by multiplying the signal $E_{cdp}$ by a factor which increases as the signal $E_{p1}$ decreases. In this way, the signal $E_{mp}$ and the limiter output signal $E_L$ vary as a function of compressor discharge pressure but are modified according to a function of fuel inlet pressure so that different acceleration limit schedules may be established when the fuel inlet pressure is at different values.

For one particular engine 13 having specific operating characteristics, it has been found desirable to make the signal $E_{mp}$ vary with the signals $E_{cdp}$ and $E_{p1}$ in accordance with the non-linear relationship:

$$E_{mp} = E_{cdp} \left( \frac{K_1}{K_2 E_{p1} + K_3} \right) \quad (1)$$

where $K_1$, $K_2$ and $K_3$ are predetermined constant factors selected in accordance with the particular engine. The achieve this relationship, the modifier 101 includes a conventional analog multiplier 105 (FIG. 2a) to which the inlet pressure signal $E_{p1}$ is applied. In addition, a voltage $E_2$ proportional to the value of the constant $K_2$ is picked off from a potentiometer 106 and applied to the multiplier, the latter multiplying the two signals and producing an output signal $E_2E_{p1}$, which is equivalent to $K_2E_{p1}$. The latter signal and a voltage $E_3$ (proportional to the constant $K_3$) from a potentiometer 107 are applied to the negative terminal of an operational amplifier 110 which algebraically adds the two signals and applies the sum thereof to an inverter 112, so that a signal representing $K_2E_{p1} + K_3$ appears at the output terminal of the inverter. A voltage $E_1$ having a value proportional to the constant $K_1$ is picked off of a potentiometer 114 and this signal is applied to an analog divider 116 along with the signal $K_2E_{p1} + K_3$ from the inverter 112. The resulting output signal from the divider is equal to:

$$\frac{K_1}{K_2E_{p1} + K_3} \quad (2)$$

and this signal is directed as one input to an analog multiplier 118, which also receives the signal $E_{cdp}$ representative of compressor discharge pressure. The product of the two input signals to the multiplier is:

$$E_{cdp}\left(\frac{K_1}{K_2E_{p1} + K_3}\right) \quad (3)$$

which thus constitutes the desired output signal $E_{mp}$ of the modifier 101 and the input signal to the acceleration limiter 55.

The multiplier, divider and operational amplifier employed in the modifier 101, as shown in FIG. 2a, are each known in the art and available commercially. Of course, in the practice of the invention, other forms of analog signal processing units may be chosen, or digital signals may be used and modified. The particular function or effect of the $P_1$ signal $E_{p1}$ on the output signal $E_{mp}$ may be changed to suit the engine or metering valve characteristics in any specific case.

Figure 4:
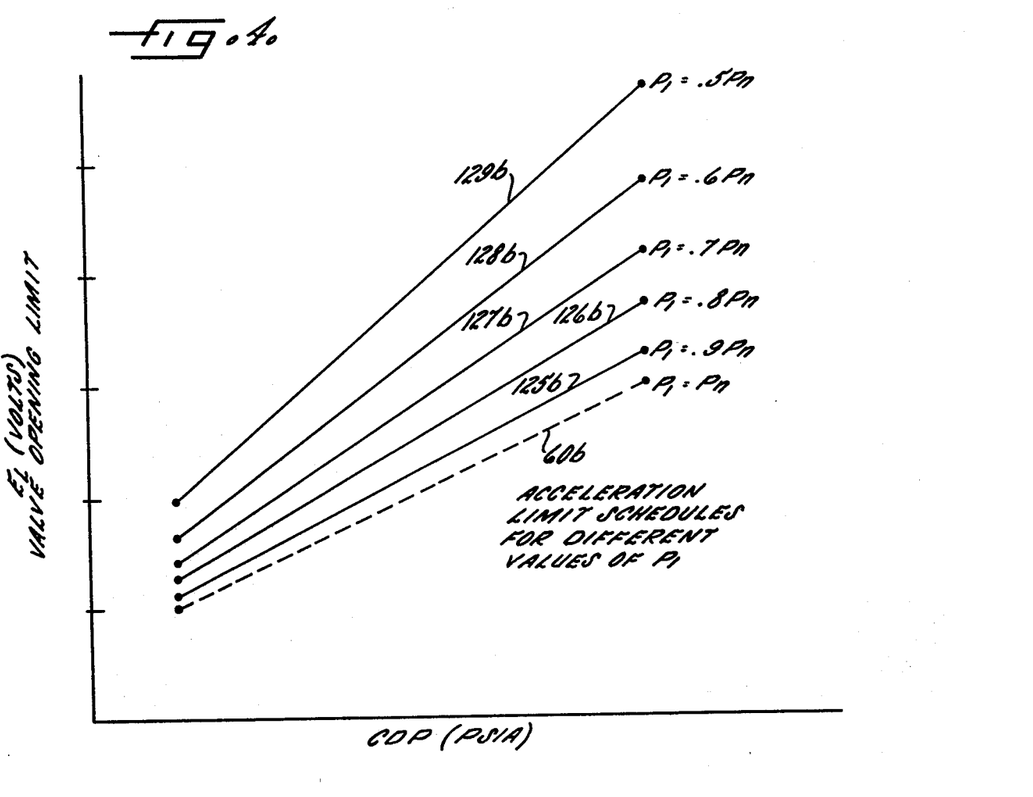
FIG. 4 is a family of curves which show the different acceleration limit schedules which prevail for different fuel supply pressures.
Figure 6:
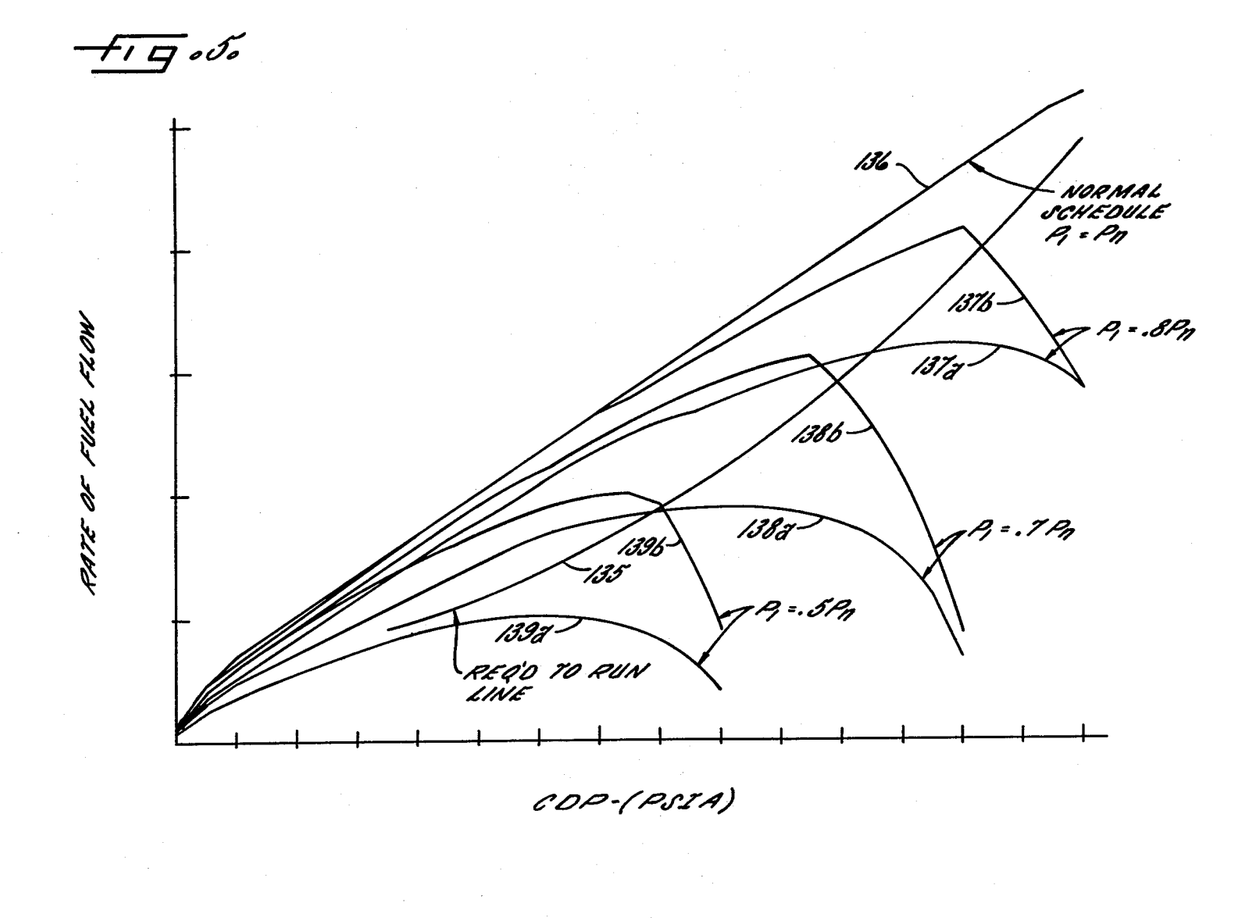

From the foregoing, it will be seen that the input signal $E_{mp}$ to the acceleration limiter 55 varies as a direct and linear function of compressor discharge pressure CDP but also varies as a non-linear, inverse function of fuel inlet pressure $P_1$. That is to say, the value of $E_{mp}$ increases as compressor discharge pressure increases and also increases as fuel inlet pressure $P_1$ decreases. When the fuel inlet pressure $P_1$ is at its normal value of $P_n$, the signal $E_{mp}$ applied to the acceleration limiter 55 causes the limit signal $E_L$ to vary according to the normal schedule 60 shown in FIG. 3. In other words, the multiplier term $$\frac{K_1}{K_2P_1 + K_3}$$

is essentially 1.0 in value when the inlet pressure $P_1$ has the normal value $P_n$ (e.g., 210 psia.). But, when the inlet pressure $P_1$ drops to different values below $P_n$, the signal $E_{mp}$ is increased in magnitude above the 1.0 value for any given value of CDP and thus the limit signal $E_L$ varies according to different schedules which result in more widely open limit positions for the metering valve 25. Such different schedules are illustrated partially in FIG. 4 wherein the reference numeral 60b represents the middle or slope (b) portion of the normal curve or schedule 60 shown in FIG. 3 when $P_1$ is equal to $P_n$, the other two portions of the curve 60 having been omitted from FIG. 4 for purposes of clarity. In FIG. 4, the reference numerals 125b, 126b, 127b, 128b and 129b represent the corresponding middle portions of the acceleration limit schedules which prevail when $P_1$ is equal to 0.9, 0.8, 0.7, 0.6 and 0.5, respectively, of $P_n$. The slope of each schedule is greater than that of the preceding schedule because of the non-linear inverse nature of the signal $E_{mp}$ with respect to $P_1$.

FIG. 4 makes it clear that for a given value of CDP, the metering valve 25 may open to progressively wider limit positions when the pressure $P_1$ falls to progressively lower values below the normal value $P_n$. Thus, when a given inlet pressure $P_1$ and compressor discharge pressure CDP exist, the governor 35 is capable of opening the valve wider than is the case when a higher inlet pressure prevails. Accordingly, the rate of fuel flow through the valve at a lower inlet pressure may approximate the rate of fuel flow at a higher inlet pressure so as to enable the engine 13 to develop substantially maximum power at the prevailing inlet pressure.

The ultimate effect of establishing different acceleration limit schedules for differing values of fuel inlet pressure $P_1$ is demonstrated by the family of curves shown in FIG. 5 wherein rate of fuel flow is plotted against CDP for a particular, exemplary engine. The curve 135 represents the steady state line or so-called "required to run" line of the engine while the curve 136 represents the normal acceleration limit schedule (in terms of rate of fuel flow) which prevails when the gas inlet pressure $P_1$ is at its normal value of $P_n$. The curves 137a, 138a, and 139a represent maximum fuel flow which the engine may receive when the pressure $P_1$ is at values of 0.8 $P_n$, 0.7 $P_n$ and 0.5 $P_n$, respectively, and the normal acceleration limit schedule is not modified in accordance with changes in inlet pressure $P_1$. The curves 137b, 138b and 139b correspond to the curves 137a, 138a and 139a, respectively, but represent the maximum fuel flow which the engine may receive when the acceleration limit schedule is established as a function of inlet pressure $P_1$ as well as CDP.

The curve 139a does not intersect the steady state line 135, and this indicates that the valve 25 cannot open sufficiently far even to allow steady state operation of the engine when the pressure $P_1$ is 0.5 $P_n$ and the normal acceleration limit schedule is followed. But, at the same value of $P_1$ and with the acceleration schedule modified according to the invention, the curve 139b intersects the steady state line, thus indicating that the valve 25 can indeed open to a position delivering enough fuel to permit steady state operation (although at relatively low power output indicated by the value of CDP at such intersection). By comparing the curve 137a with the curve 137b and by comparing the curve 138a with the curve 138b, it will be seen that in each instance the steady state line 135 is intersected at a higher point when the modified rather than the normal acceleration limit schedule is followed. Thus, more fuel is delivered to the engine and the engine can deliver more power at a given fuel inlet pressure $P_1$ when the acceleration limit schedule is modified as an inverse function of inlet pressure. Each of the curves 137b, 138b and 139b falls below the normal limit schedule 136 and thus there is no danger of the engine receiving too much fuel for safe operation, i.e., excessive temperature and surge are avoided. While it perhaps would be ideal for the curves 137b, 138b and 139b to coincide precisely with the normal schedule 136 over the full range of the schedule 136, this would be achieved by using an electronic modifier considerably more complex than the present modifier 101; thus, in the present embodiment, such a complex and expensive modifier is not used, and the system in the face of falling $P_1$ is partially, but significantly, restored to the full operational capability under normal conditions.

From the foregoing, it will be apparent that the present invention brings to the art a new and improved engine control system in which the inlet pressure of the gaseous fuel supply is detected and is used in establishing the acceleration limit schedule so that different schedules may prevail when the inlet pressure drops below its normal value. As a result, the engine is capable of accelerating at a faster rate and developing more power than would be possible if only the normal acceleration limit schedule were effective at various inlet pressures.

I claim:

1. A control system for a gas turbine engine operated from a gaseous fuel supply, said system comprising fuel control valve means interposed between said supply and said engine, a governor coupled to said engine and operable to cause opening and closing displacement of said valve means to vary the rate of fuel flow to said engine, first means for detecting the compressor discharge pressure of said engine, second means upstream of said valve means for detecting the pressure of the fuel supply to said valve means, and means acting independently of said governor and responsive to both said first and second means for limiting opening displacement of said valve means in accordance with (i) a normal schedule established by changes in compressor discharge pressure when fuel supply pressure is at a normal predetermined value and (ii) different schedules established by changes in compressor discharge pressure when said fuel supply pressure is at different values other than said normal value.

2. A control system as defined in claim 1 wherein said responsive means includes means for establishing limit schedules on the opening of said valve means to make the maximum opening vary as a generally inverse function of changes in said fuel supply pressure.

3. A control system as defined in claim 1 in which said first means and said second means produce first and second signals, respectively, representative of compressor discharge pressure and fuel supply pressure, respectively, said responsive means including means for receiving said signals and for multiplying said first signal by a factor which increases as said second signal decreases.

4. In a control system for a gas turbine engine operated from a gaseous fuel supply at a pressure which may differ or vary from a normal value, the combination comprising
    (a) a control valve interposed between said supply and said engine and opened as a function of a final control signal applied thereto,
    (b) a governor coupled to the engine and including means for producing a corrective error signal,
    (c) means for producing a first signal which varies in accordance with a parameter of the engine operation,
    (d) means upstream of said control valve for producing a second signal which varies in accordance with the fuel supply pressure,
    (e) means responsive to said first and second signals for producing a third signal which normally varies according to the first signal but is modified according to a function of the second signal,
    (f) means responsive to said third signal for creating a limit signal which varies according to a predetermined limit schedule, and
    (g) means for applying to said valve a final control signal which varies according to the value of the lesser one of (i) said error signal or (ii) said limit signal.

5. The combination set forth in claim 3 further characterized in that said means (e) includes means for multiplying said first signal by a factor which increases as the fuel supply pressure decreases.

6. The combination set forth in claim 4 in which the first signal produced by said means (c) varies in accordance with changes in the compressor discharge pressure of said engine.

* * * * *